July 22, 1969  MITITAKA YAMAMOTO  3,457,391
VENDING APPARATUS FOR USE WITH CREDIT CARDS
Filed July 19, 1965 2 Sheets-Sheet 1
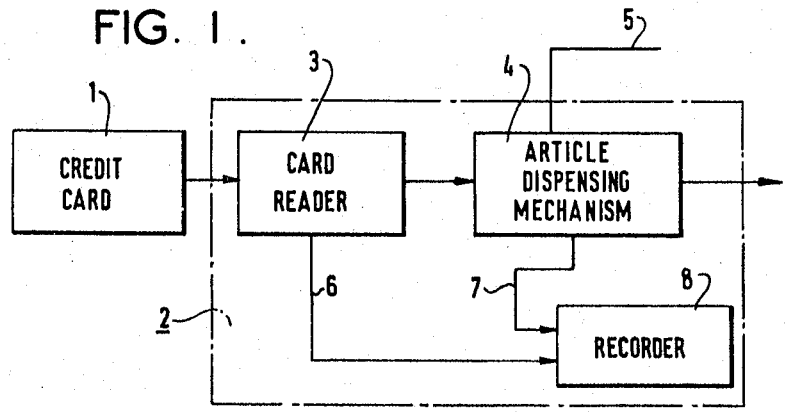
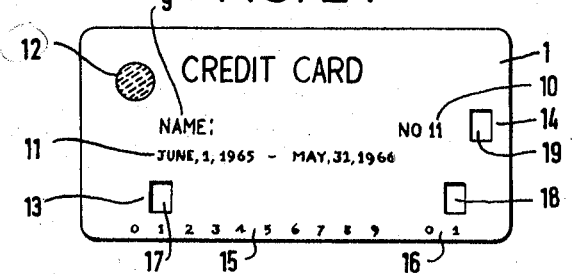
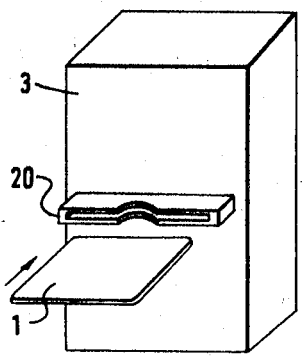
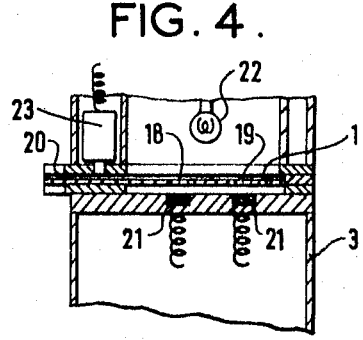
MITITAKA YAMAMOTO
INVENTOR
BY *Orland M. Christman*
ATTORNEY

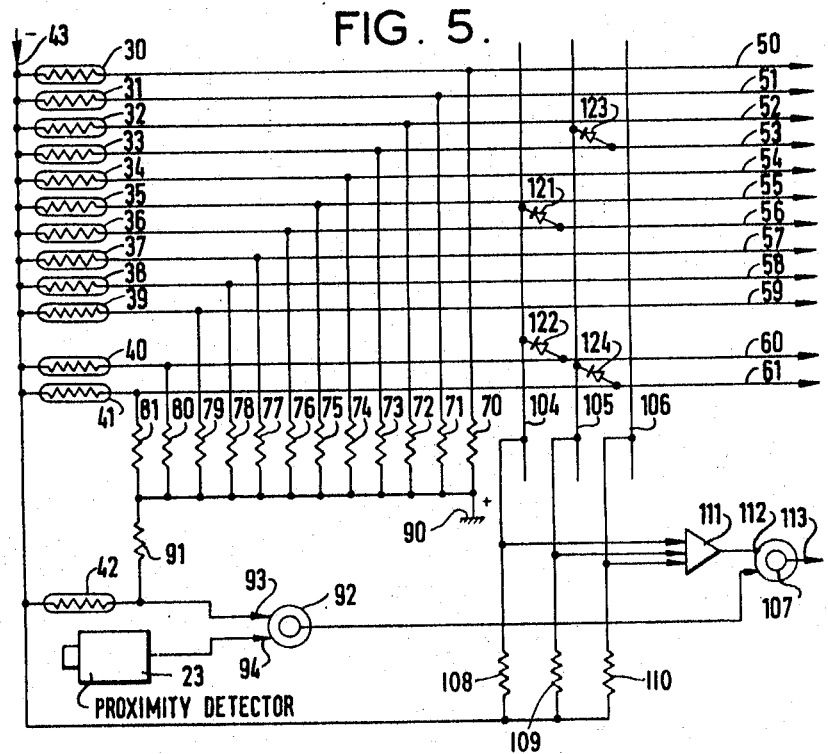

United States Patent Office 3,457,391
Patented July 22, 1969

3,457,391
VENDING APPARATUS FOR USE WITH CREDIT CARDS
Mititaka Yamamoto, 17 Ryoanji Gotanda-cho, Ukyo-ku, Kyoto, Japan
Filed July 19, 1965, Ser. No. 472,971
Claims priority, application Japan, July 20, 1964, 39/41,201
Int. Cl. G06c 29/00
U.S. Cl. 235—61.6                           1 Claim

ABSTRACT OF THE DISCLOSURE

A simplified pinboard type of invalid card identifying means is provided for a vending apparatus of the type including pricing and article dispensing means operated by insertion of a credit card having light-transmitting portions located thereon corresponding to its identification number. A card reader in the apparatus includes a light source and a plurality of photosensitive elements positioned to be excited by light transmitted from the source through the light-transmitting portions of the inserted credit card. Insertion of electrically conductive pins or the like in the pinboard closes circuits between inputs of an AND element and selected ones of the photosensitive elements corresponding collectively to an invalid card identification number, so that upon insertion in the apparatus of a card bearing the invalid number the circuit provides a signal inhibiting transmittal of a dispense permission signal to the article dispensing means.

BACKGROUND AND SUMMARY OF THE INVENTION

This invention relates to vending apparatus for use with credit cards and more particularly to a system for checking the validity of credit cards used in such vending apparatus.

In recent years there have become prevalent credit sales systems wherein sellers of various services, mechandises and products previously issue credit cards to customers so that the customers can purchase the services or goods offered by a vending machine by inserting their credit cards into the machine, without having any coins or cash. In order to protect against various possible fraudulent practices performed on the credit card type of vending machines, it is necessary to check the validity of the credit cards used. By the validity of the credit card it is meant that the card is genuine and not forged; that the card used is within a predetermined period of availability; and that the purchaser who uses the card is the one to whom the card was originally issued or duly assigned. If a credit card is lost or stolen, it is necessary to have the identification number of the lost or stolen card registered or memorized in the vending machines in which the card is expected to be used, so that if the card is used in any of the vending machines which memorize that identification number, the machine will not operate.

In one prior art apparatus for checking the validity of credit cards, when a card having a specific coded identification number is inserted in a suitable slot provided in the vending machine, the identification number is read by a suitable card reader and compared against each of a group of the identification numbers of the invalidated cards previously recorded in the machine in a similar coded manner. In such an arrangement, every time a card is inserted, all of the stored identification numbers of invalid cards must be scanned. This not only is time-consuming but also results in a structural complication since both scanning and comparing means are required.

Accordingly, it is one object of the invention to provide a system for checking the validity of credit cards for use in the credit card type of vending machines, wherein the recording or memorizing of the identification numbers of invalid credit cards is much simplified.

Another object of the invention is to provide such a system as aforesaid, which is capable of checking the validity of credit cards insert into the system immediately upon reading of the cards without any necessity of scanning all of the identification numbers of invalid cards previously stored in the system.

Another object of the invention is to provide such a system as aforesaid which comprises static elements.

Other objects, features and advantages of the invention will become apparent from the following description of preferred embodiments of the invention with reference to the accompanying drawings, wherein:

FIG. 1 is a schematic block diagram of one embodiment of the invention;

FIG. 2 is a plan view of a preferred form of a credit card used in the system of the invention;

FIG. 3 is a perspective view of a card reader for use in the system of the invention;

FIG. 4 is a vertical sectional view of FIG. 3;

FIG. 5 is a circuit diagram of the system of the invention;

FIG. 6 is a modified circuit diagram of the memorizing portion of FIG. 5; and

FIG. 7 is a schematic view of an article dispensing means of a vending machine, suitable for use with the system of the invention.

In accordance with the invention, a purchaser inserts his credit card into a predetermined slot of a vending machine and pushes a desire done of the push buttons each corresponding to one of the different kintds of articles on sale. The machine is provided with a card reader and a recorder for recording the required information about each sale. The card reader reads the identification number of the credit card the purchaser has inserted into the machine and the recorder records the identification number and the price of the article selected and other necessary information such as the date of the sale. The present invention, however, is not concerned with the recorder, no further explanation of which will be given below.

As previously mentioned, when a credit card is inserted into the machine, it is necessary to check the validity of the card, that is, to confirm that the card is genuine and within the period of its availability. This confirmation is made by the card reader. For this purpose, each credit card is provided with a suitable member such as for example a label containing a specific material by which a detector installed in the card reader can recognize the card as genuine. Each credit card is also provided with an identification number in the form of suitable codes, such as defined areas rendered light-transmitting or performations or penings at different locations on the card. Thus, when the card is inserted into the card reader, light passes through the light-transmitting portions or perforations to illuminate photosensitive elements provided in the card reader corresponding to the location of the light-transmitting areas or perforations to decrease the resistance values of the elements, whereupon the elements produce signals to be applied as a customer's identification signal to the recorder. The identification numbers of the credit cards that have been invalidated are memorized as positions of diodes connected in a diode matrix inserted in the net work through which the customer's identification signals are transmitted. If the identification number of a card the card reader has just read happens to coincide with any one of the invalid identification numbers stored in the diode matrix, the matrix produces a signal, which prevents production of a signal to actuate an article dispensing mechanism of the vending machine.

Referring now in detail to FIG. 1, a credit card 1 is inserted into a card reader 3 installed in an automatic vending machine 2. When the card reader has confirmed the validity of the card 1 and recognized its identification number, a signal is produced to be applied to an article dispensing mechanism 4. This signal will be referred to as a "dispense permission" signal hereinafter. A signal produced upon selection of a kind of article by the purchaser is applied through a line 5 to the dispensing mechanism 4 which dispenses an article. The mechanism also produces a signal corresponding to the price of the article that has been selected by a purchaser. This signal is applied through a line 7 to a recorder 8, to which the signal corresponding to the identification number that has been read by the recorder 3 is also applied through a line 6, whereupon the recorder records the identification number and the price of the article.

FIG. 2 shows by way of example a preferred form of the credit card for use in the system of the invention. The card 1 is provided with a label 12 or the like which contains powders of suitable magnetic material such as ferrite for discrimination of the card against false cards. An identification number and a period of availability are given in the form of suitable codes such as different, defined portions of the card 1 which are rendered light-transmitting, or perforations or openings formed at different locations on the card 1. It has been assumed here that there are twenty customers in all, and that the card illustrated in FIG. 2 is given the identification number of 11. Within an area designated by 15, there are shown ten locations corresponding to the figures 0 through 9, which are intended to express figures in the first place of two-figure numbers, and within another area designated by 16, there are two locations corresponding to the figures 0 and 1, which are intended to express figures in the second place of the two-figure numbers. In the illustrated embodiment, since the identification number of the card is 11, two openings 17 and opening 18 are punched out at two locations corresponding to the figure 1 in the area 15 and the figure 1 in the area 16, respectively. If there are one hundred customers in all, the area 16 may be enlarged sufficiently to accommodate eight more locations corresponding to the figures 2 through 9 to be punched out. If the number of customers exceeds one hundred (but less than one thousand), a third area for similar locations may be provided on the card.

An opening 19 is formed in the area 14 as a code for the period of availability of the card. The period is determined by the relative positions of the opening on the card. A different position may serve for a different period of availability of the card.

As shown in FIG. 3, the card is inserted into a slot 20 of the card reader 3 far enough to be placed at a predetermined position in the card reader. As shown in FIG. 4, within the card reader 3 and at one side of the card inserted, there are provided a plurality of photosensitive elements 21 made of for example cadmium sulfide. The arrangement is such that each of the photosensitive elements are so positioned as to face one of the previously mentioned locations in the areas 14, 15 and 16. In the illustrated embodiment, there are provided thirteen photosensitive elements since there are thirteen such locations in all.

A light source 22 faces the opposite or upper surface of the inserted card. The light from the source thus passes through the openings 17, 18 and 19 to impinge on the corresponding photoelectric elements, with a resulting decrease in the resistance values of the elements.

A proximity detector 23 is so arranged as to face the metallic label 12 on the card inserted in place. If the inserted card is genuine, the label 12 is detected by the detector 23, which then produces a signal.

A circuit arrangement for the card reader 3 is shown by way of example in FIG. 5. The card reader comprises circuit means for reading the coded identification number on the inserted card and circuit means for checking the validity of the card. As shown, photosensitive elements designated by the numerals 30 through 39 correspond to the ten locations 0 through 9 of the area 15 of the credit card; photosensitive elements 40 and 41, to the two locations 0 and 1 in the area 16; and a photosensitive element 42, to the location 14. The elements 30 through 41 are connected at one end to a negative potential line 43 and at the other to lines 50 through 61, respectively. These lines lead to the recorder 8 as shown in FIG. 1 and are also grounded as at 90, through resistors 70 and 81, respectively. The element 42 has its one end connected to the negative line 43 and the other end connected to the grounding line through a resistor 91. It will be easily seen that the ground potential is positive with respect to the negative line 43. The element 42 has its other end also connected to one input 93 of an AND element 92, to the other input 94 of which is applied the output of the proximity detector 23.

When there is neither light on the photoelectric element 42 nor magnetic material sensed by the proximity detector 23, the AND element 92 receives no signals at its two input terminals 93, 94. However, when the element 42 receives light and the detector 23 detects the metallic material of the label of the card, the AND element 92 receives input signals and produces an output signal to be applied to the input terminal of an INHIBIT element 107.

Lines 104, 105 and 106 are connected to the negative potential line 43 through resistors 108, 109 and 110, respectively, and also to the three input terminals of an OR element 111, respectively. The output of the OR element 111 is applied to the inhibit terminal 112 of the INHIBIT element 107. The output of the element 107 appearing on line 113 will be applied to the article dispensing mechanism 4 as a "dispense permission" signal.

Memory of the identification numbers of those credit cards that have been invalidated can be stored by connecting diodes between one or more of the lines 104, 105, 106 and those of the lines 50 through 61 which correspond to the invalid identification numbers. In the illustrated embodiment, diodes 121 and 122 connect the lines 56 and 60 to the line 104, respectively, whereby the identification No. 6 is memorized as an invalid number since the lines 60 and 56 correspond to the figures 0 and 6 in the second and the first place of a two digit number, respectively; while diodes 123 and 124 connect the lines 53 and 61 to the line 105, respectively, thereby memorizing the identification No. 13 as invalid. It will be understood that the pair of diodes 121, 122 and the resistor 108 constitute an AND element, with the lines 56 and 60 as its two input lines and the line 104 as its output line leading to one of the inputs of the OR element 111. Similarly, the diodes 123 and 124 and the resistor 109 constitute an AND element. The line 106 may be used for memorization of a third invalid number. Since each of the three lines 104, 105 and 106 is available for memorization of only one invalid number, as many lines similar to these lines as there are additional invalid numbers to be memorized may be added.

When there is no credit card inserted in the card reader 3, all the photosensitive elements 30 through 41 have a high resistance value, so that the potential at ground 90 will be applied to two of the inputs of the OR element 111 through the resistors 76, 80 and 73, 81 and the diodes 121, 122 and 123, 124. However, the ground potential does not function as an input signal to the OR element 111. In order for the element 111 to produce an output, the input signal applied thereto must be negative. This condition is effected only when the potentials applied to the two diodes 121, 122 or 123, 124 become negative at the same time.

When a valid credit card is inserted in the card reader, the AND element 92 produces an output as previously mentioned. If the card bears an identification No. 18, the resistance values of the photosensitive elements 41 and 38 decrease to cause the potentials on the lines 61 and 58 to become negative. These potentials will be applied as input signals to the recorder. However, the potentials on the lines 104 to 106 remain positive, so that the OR element 111 will receive no input signal and, therefore, produce no output signal to be applied to the inhibit terminal of the INHIBIT element 107. As previously mentioned, a signal is applied by the AND element 92 to the input terminal of the INHIBIT element 107, which produces an output signal on the line 113. This signal will set the article dispensing mechanism ready to dispense an article that has been selected.

Suppose that a card identified as No. 13 and registered as invalid in the card reader is inserted thereinto. If this card is genuine and within the period of its availability, the AND element 92 will produce an output, as before, which will be applied to the input terminal of the INHIBIT element 107. However, the resistances of the photosensitive elements 33 and 41 have been decreased so that the potential on the line 105 has become negative, whereupon an input signal is applied to the OR element 111 to produce an output therefrom. This output of the OR element 111 serves as an inhibit signal to the element 107, so that the element 107 will not produce any signal to be applied to the article dispensing mechanism.

FIG. 6 shows a different arrangement of the memorizing circuit portion of FIG. 5. Here, the diode 121 has its one end connected to the line 104 and the opposite end connected to the lines 50 through 59 through jacks 100, respectively; while the diode 122 having its one end connected to the line 104 has its opposite end connected to the lines 60, 61 through jacks 101, respectively. Similarly, the diode 123 has its one end connected to the line 105 and its opposite end connected to each of the lines 50 through 59 through a jack 102, and the diode 124 has its one end connected to the line 105 and its opposite end connected to each of the lines 60, 61 through a jack 103. It will be easily seen that in order to memorize an identification number, for example, No. 6, a plug may be inserted in the seventh jack 100 from above with respect to the diode 121 and the upper pack 101 with respect to the diode 122.

If the credit card that has been inserted into the card reader is a forged one and/or its period of availability has already expired, no output signal will be produced by the AND element 92 and consequently the INHIBIT element 107. It will thus be seen that in order for the element 107 to produce a "dispense permission" signal on the line 113, there must be a concurrence of the three signals, that is, (1) a signal produced by the proximity detector 23 when the inserted card has been recognized as genuine, (2) a signal produced when the card is within the period of availability and (3) a signal produced when the identification number of the card is not among those numbers previously stored in the card reader as invalid.

If there is a group of vending machines installed in an establishment in a more or less mutually related manner, the checking system of the invention installed in each of the vending machines does not necessary include the individual circuit means for memorizing invalidated identification numbers, but the systems of all the machines may have a common memorizing circuit. In this case, the common memorizing circuit may be positioned separately from each of the machines.

A preferred embodiment of the article dispensing means is shown in FIG. 7. The signal appearing on the line 113 is applied through a line 131 to one of the two input terminals of an AND element 132. A pair of ganged push button switches 133 and 134 are provided for operation by a purchaser. When the switches are closed, an input signal is applied to the other of the two input terminals of the AND element 132. When the two input signals are simultaneously applied to the AND element 132, it produces an output, which is applied through a line 135 to the recorder to initiate its operation, on one hand, and through a line 136 to a magnetic relay 137 on the other hand. Upon energization of the relay 137, a magnetic device acts on a door 139 to open it for an article 140 to be delivered onto a receptacle 141, from which the purchaser may take it up.

Upon closing of the switch 134, a signal corresponding to the price of the article that has been selected is applied through a line 142 to the recorder 8 (FIG. 1), where the price is recorded. If the articles to be dispensed are of a single kind or of different kinds but of the same price, the line 142 is not required. However, if there are articles of different kinds and prices to be dispensed, the circuit arrangement as shown in FIG. 7 is required for each of the different kinds. In this case, since the machine is provided with as many sets of the ganged push button switches as there are kinds of articles among which the purchaser may choose, a signal corresponding to the price of each of the different kinds of articles that have been sold can be produced for recording of the different prices of different kinds of articles.

It should be recognized that the embodiments disclosed herein are merely representative and that further modifications and changes may be made without departing from the true scope and spirit of the invention.

What I claim is:

1. A vending apparatus for use with credit cards having light transmitting portions differently located thereon in accordance with their respective identification numbers, comprising:
   (a) means for receiving one of said credit cards and reading the identification number thereof, including a light source and a plurality of photosensitive elements positioned to be excited by light from said source transmitted through said portions of one of said cards when inserted in the receiving means, whereby the photosensitive elements corresponding to the identification number of said card are excited and produce corresponding identification number signals;
   (b) means for sensing the presence or absence of a predetermined material at a selected location on said card and producing a genuineness signal;
   (c) means for dispensing an article selected by a purchaser and producing a signal corresponding to the price of the selected article;
   (d) means for receiving said price signal and said identification number signals and recording corresponding price and identification number information;
   (e) means for providing a dispense permission signal to said dispensing means, including an INHIBIT element having a permission signal input controlled by said genuineness sensing means and an INHIBIT signal input for preventing transmittal of a permission signal to said dispensing means; and
   (f) means for applying an INHIBIT signal to said INHIBIT signal input in response to insertion of a card bearing an invalid identification number into said receiving means, including
      (1) an AND element for each invalid identification number, said AND elements each having a plurality of inputs and a common output connection to said INHIBIT signal input, and
      (2) open circuit means interposed between each of said AND element inputs and one of said photosensitive elements, said open circuit means being selectively operable to receive electrically conductive means therein to close the circuits between said AND element inputs and selected photosensitive means collectively corresponding to an invalid identification number.

(References on following page)

References Cited

UNITED STATES PATENTS

| | | | |
|---|---|---|---|
| 2,704,634 | 3/1955 | Rauch | 235—61.12 |
| 2,714,201 | 7/1955 | Whitehead. | |
| 2,792,148 | 5/1957 | Goldenberg. | |
| 3,033,448 | 5/1962 | Quinn | 235—61.115 |
| 3,039,582 | 6/1962 | Simjian. | |
| 3,061,143 | 10/1962 | Simjian. | |
| 3,148,460 | 9/1964 | Haritonoff | 235—61.603 |
| 3,184,714 | 5/1965 | Brown et al. | 200—46 X |
| 3,212,203 | 10/1965 | Atkinson | 235—61.603 |
| 3,299,298 | 1/1967 | Schinner. | |

DARYL W. COOK, Primary Examiner

ROBERT M. KILGORE, Assistant Examiner

U.S. Cl. X.R.

194—4; 235—61.11; 340—149